United States Patent [19]
Price, III

[11] Patent Number: 5,906,147
[45] Date of Patent: May 25, 1999

[54] WRENCH-TO-BOLT COUPLING ASSEMBLY

[75] Inventor: Abner B. Price, III, King George, Va.

[73] Assignee: The United States of America as represented by the Secretary of the Navy, Washington, D.C.

[21] Appl. No.: 09/056,715

[22] Filed: Apr. 8, 1998

[51] Int. Cl.[6] .................................................. B25B 23/00
[52] U.S. Cl. ................................ 81/461; 81/451; 81/456
[58] Field of Search .............................. 81/461, 451, 456, 81/125

[56] References Cited

U.S. PATENT DOCUMENTS

| | | | |
|---|---|---|---|
| 1,007,107 | 10/1911 | Hulsmann | 81/459 |
| 4,466,314 | 8/1984 | Rich | 81/461 |
| 4,552,042 | 11/1985 | Beymer . | |
| 5,193,420 | 3/1993 | Smith . | |
| 5,272,943 | 12/1993 | Edwards . | |

*Primary Examiner*—Timothy V. Eley
*Assistant Examiner*—Sinclair Skinner
*Attorney, Agent, or Firm*—James B. Bechtel, Esq.

[57] ABSTRACT

A coupling assembly couples a drive portion of a torque wrench to a bolt having a head formed with spanner wrench holes in a top thereof and an annular groove therearound. A base engages the annular groove until it is in coaxial alignment with the bolt. Aligning holes in the base are alignable with at least two of the bolt's spanner wrench holes. Each of a plurality of pins sized for sliding engagement with the aligning holes and the spanner wrench holes are fixed in relation to one another by a yoke. The yoke further aligns the pins with the aligning holes. A collar nut engages the base to retain the yoke thereagainst thereby locking the assembly to the head of the bolt. The base is shaped to receive the drive portion of a torque wrench.

14 Claims, 5 Drawing Sheets

WRENCH-TO-BOLT COUPLING ASSEMBLY

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to torque wrench accessories, and more particularly to a coupling assembly used to couple a torque wrench to a cargo projectile's base plug or any bolt having a head with spanner wrench holes formed in a top surface thereof and with an annular groove therearound.

BACKGROUND OF THE INVENTION

The U.S. Navy utilizes a cargo projectile having a removable plug mounted in the aft end thereof as illustrated in FIG. 1. More specifically, a base plug 10 seals an aft end 22 of a cargo projectile 20 by means of threads 11 engaging threads 21 on aft end 22. A head of base plug 10 is referenced generally at 12 and includes an annular groove 14 and two diametrically-aligned spanner wrench holes 16 formed in a top 18 of base plug 10. Annular groove 14 receives a rotating nylon band (not shown) that is discarded as the projectile leaves a muzzle and holes 16 receive spanner-wrench pins of a coupling as will be explained below.

Base plug 10 must be torqued to specifications, i.e., sufficient to withstand launch forces. When the cargo in projectile 20 is to be dispersed, base plug 10 is ejected from aft end 22 by means known in the art. To tighten or loosen base plug 10, a steel plate 30 having pins 32 extending therefrom is placed on base plug 10 such that pins 32 engage holes 16. A drive hole 34 (e.g., a square hole) is provided in plate 30 to receive the driver portion of a torque wrench (not shown). As torque is applied to plate 30, pins 32 can frequently slip out of engagement with holes 16 thereby creating a safety hazard for person(s) operating the torque wrench. In applications requiring high torque values, the necessary torque values are either not achievable or are dangerous to achieve.

SUMMARY OF THE INVENTION

Accordingly, it is an object of the present invention to provide an assembly for coupling a standard torque wrench to a base plug of a cargo projectile.

Another object of the present invention is to provide an assembly for coupling the drive portion of a torque wrench to a bolt having a head formed with spanner wrench holes in a top thereof and an annular groove therearound.

Other objects and advantages of the present invention will become more obvious hereinafter in the specification and drawings.

In accordance with the present invention, an assembly is provided to couple a drive portion of a torque wrench to a bolt having a head formed with spanner wrench holes in a top thereof and an annular groove therearound. A base has a first portion that engages the annular groove until the first portion is in coaxial alignment with the bolt. The first portion is provided with aligning holes therethrough that are alignable with at least two of the bolt's spanner wrench holes. The base further has a cylindrical second portion with its exterior radial surface being at least partially threaded. The second portion is coaxially aligned with the bolt and the first portion. The first end of the second portion is centrally positioned between the aligning holes and is fixedly coupled to the first portion. The second or outboard end of the second portion is shaped to receive the drive portion of a torque wrench. Each of a plurality of pins sized for sliding engagement with the aligning holes and the spanner wrench holes are fixed in relation to one another by a yoke. The yoke further aligns the pins with the aligning holes. The yoke straddles the second portion of the base such that, when the yoke abuts the first portion, the pins engage the aligning holes. A collar nut has an inside surface that is at least partially threaded to engage the radial surface of the second portion. The collar nut can be spun on the second portion to retain the yoke against the first portion of the base thereby locking the assembly to the head of the bolt.

DETAILED DESCRIPTION OF THE INVENTION

Figure 1:
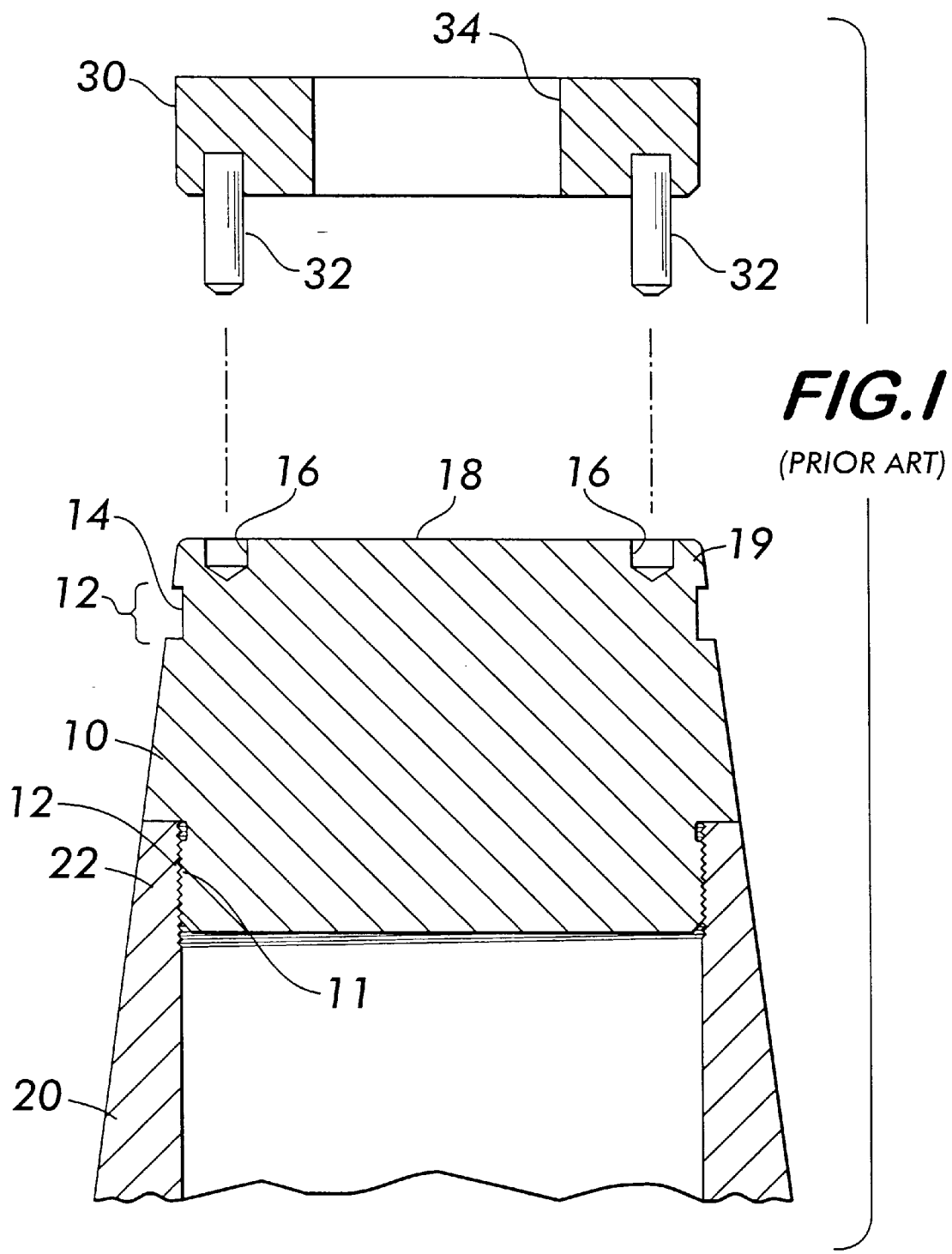
FIG. 1 is a cross-sectional view of the aft portion of a plug-sealed cargo projectile and the wrench coupling used in the prior art.
Figure 2:
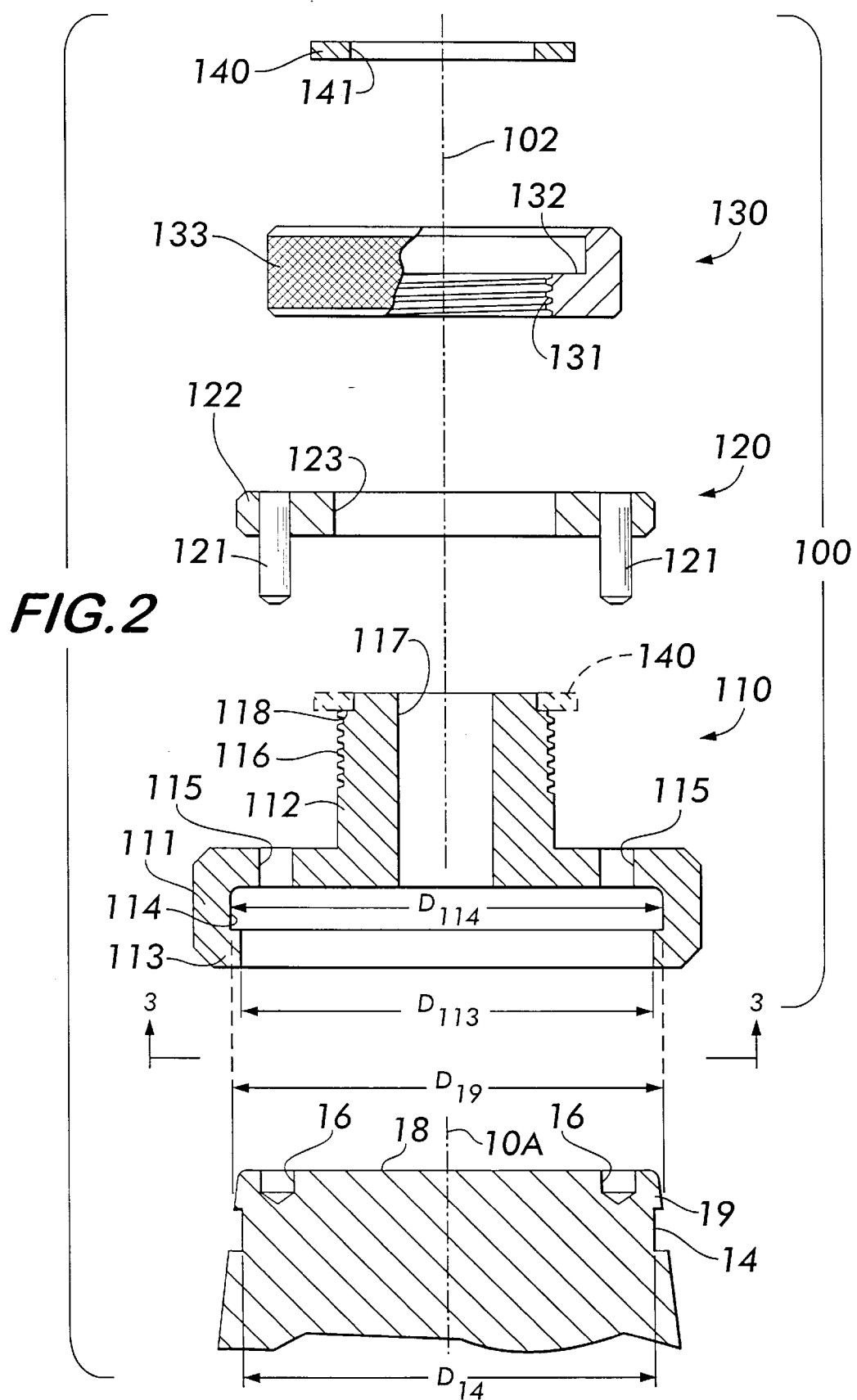
FIG. 2 is an exploded cross-sectional view of one embodiment of the coupling assembly in accordance with the present invention.

Referring now to the drawings, and more particularly to FIG. 2, an exploded cross-sectional view of an embodiment of the coupling assembly of the present invention is shown and referenced generally by numeral 100. Coupling assembly 100 will be used to couple a standard torque wrench to a base plug such as base plug 10, the relevant portion of which is illustrated. However, as will become apparent from the following description, coupling assembly 100 can be used to couple a standard torque wrench to any bolt head having spanner wrench holes in a top thereof and an annular groove cut into and around the bolt head.

Coupling assembly 100 includes a base 110, a pin assembly 120, a finger nut 130 and a retainer 140. Once assembled as coupling assembly 100, a common longitudinal axis 102 passes through the centers of base 110, pin assembly 120, finger nut 130 and retainer 140. In use, longitudinal axis 102 will be aligned with the longitudinal axis 11 of base plug 10 (or bolt) on which coupling assembly 100 is installed. Materials used for the components of coupling assembly 100 are typically rigid metals that can withstand the torque to be applied during use of assembly 100.

Figure 3:
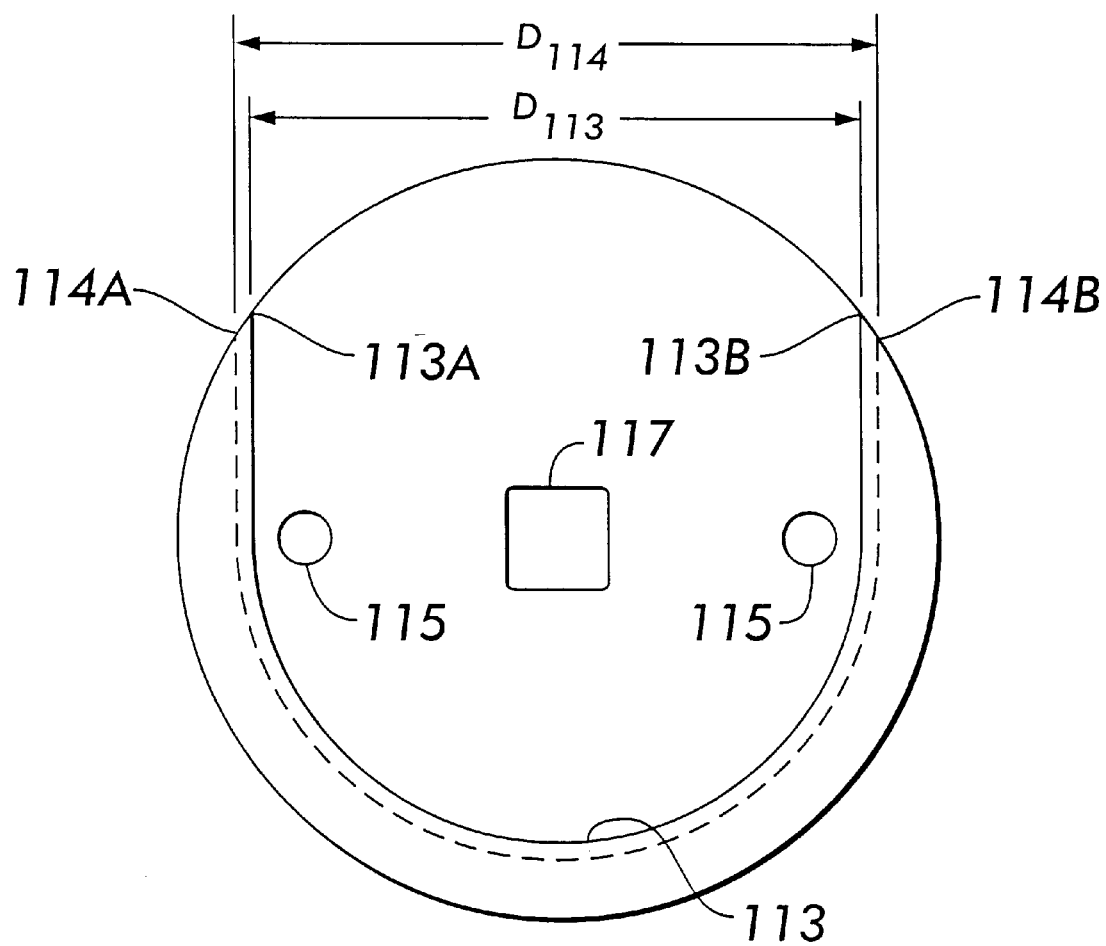
FIG. 3 is a plan view of the base of the coupling assembly taken along line 3—3 of FIG. 2.

Base 110 is formed of two generally cylindrical portions 111 and 112 fixedly coupled to or integral with one another. Referring additionally to FIG. 3, portion 111 has a lip 113 formed partially about the periphery of its outboard end with the distance $D_{113}$ between the ends 113A and 113B of lip 113 being equal to the diameter $D_{14}$ of base plug 10 at annular groove 14. A groove 114 is cut into lip 113 such that the distance $D_{114}$ between the ends 114A and 114B of groove 114 is equal to the diameter $D_{19}$ of base plug 10 at annular lip 19 formed by annular groove 14 and top 18 of base plug 10.

First portion 111 is also provided with aligning holes 115 that will align with spanner wrench holes 16 on base plug 10 when base 110 is coupled to base plug 10 as will be described further below. Typically, two diametrically aligned holes 115 are provided as shown. However, additional such holes can be provided if additional spanner wrench holes 16 are provided in base plug 10.

Second portion 112 is essentially a hollow cylindrical shaft with its outside surface at least partially threaded as shown at 116. The hollow central portion 117 of second portion 112 is sized and shaped to receive the driver portion of a torque wrench. For example, central portion 117 can be square-shaped as shown in FIG. 3 to slidingly receive the square driver portion of a standard torque wrench. Finally, in the illustrated embodiment, the outboard end of second portion is annularly cut away at its periphery to define an annular collar 118. The function of annular collar 118 will be discussed further below.

Pin assembly 120 has pins 121 sized and shaped for sliding engagement with both aligning holes 115 and spanner wrench holes 16. Typically, the number of pins 121 coincides with the number of spanner wrench holes. It is generally advisable to use at least two pins 121. The alignment of pins 121 relative to one another is fixed by a yoke 122 to which pins 121 are attached or made integral therewith. Yoke 122 is cut away at its central portion 123 to fit around second portion 112. Typically, yoke 122 is a plate with central portion 123 formed as a hole therethrough that allows yoke to be slid on and along second portion 112.

Finger nut 130 is illustrated partially in a side view and partially in cross-section. In the cross-sectional view, finger nut 130 is at least partially threaded at its interior surface as indicated at 131. Threads 131 will cooperate with threads 116. Where threads 131 terminate within finger nut 130, material is cut away from the inside of finger nut 130 to define an annular lip 132. The exterior surface 133 of finger nut 130 can be knurled as shown or otherwise serrated for improved grip. Exterior surface 133 could alternatively be capped with a grip improving material such as certain plastics or rubber-like materials.

Retainer 140 is essentially a flat washer having its hole 141 sized for a press-fit engagement with the outboard end of second portion 112 until retainer 140 abuts annular collar 118. This is illustrated in phantom in FIG. 2 since retainer 140 is the last component to be put in place on coupling assembly 100. Such assembly of coupling assembly 100 is accomplished by placing pin assembly 120 on or about second portion 112. Finger nut 130 is screwed at least partially onto second portion 112. Finally, retainer 140 is press-fit into engagement with second portion 112 as described above. In this way, as finger nut 130 is spun away from first portion 111, annular lip 132 and retainer 140 will abut to prevent the disassembly of coupling assembly 100.

In operation, base 110 is slid onto base plug 10 from the side thereof such that lip 113 engages annular groove 14 while annular lip 19 is engaged in groove 114. Once fully slid into engagement, the longitudinal axis of base 110 and base plug 10 are aligned. Base 110 can be spun around its axis 102 until holes 115 are aligned with spanner wrench holes 16. Next, pin assembly 120 is slid about second portion 112 and towards first portion 111. When pins 121 are fully engaged in aligning holes 115 such that yoke 122 abuts first portion 111, pins 121 are also engaged in spanner wrench holes 16. Finger nut 130 is then spun on second portion 112 to hold pin assembly 120 in place. The driver portion of a torque wrench is inserted into central portion 117 and the appropriate torque is applied.

The advantages of the present invention are numerous. The installation and proper application of torque to a cargo projectile's base plug is made safe since the coupling assembly is locked onto the base plug. This also means that the individual applying the torque will have the confidence to concentrate solely on the task at hand.

Although the invention has been described relative to a specific embodiment thereof, there are numerous variations and modifications that will be readily apparent to those skilled in the art in light of the above teachings. For example, in FIG. 4, coupling assembly 200 makes use of a base 210 (nearly identical to base 110), the same pin assembly 120 and finger nut 130 described above, and a retainer 240 which is a plate. Retainer 240 has a central hole 241 for allowing the passage of the driver portion of a torque wrench. Retainer 240 is also provided with screw holes 242 aligned with screw holes 219 formed in the top of second portion 212. Once pin assembly 120 and finger nut 130 are assembled with base 210, retainer is attached to base 210 by means of screws 243 that pass through pin assembly 120 and finger nut 130. Retainer 240 functions similarly to retainer 140 in that it will cooperate with annular lip 132 to prevent the disassembly of coupling assembly 200.

Figure 4:
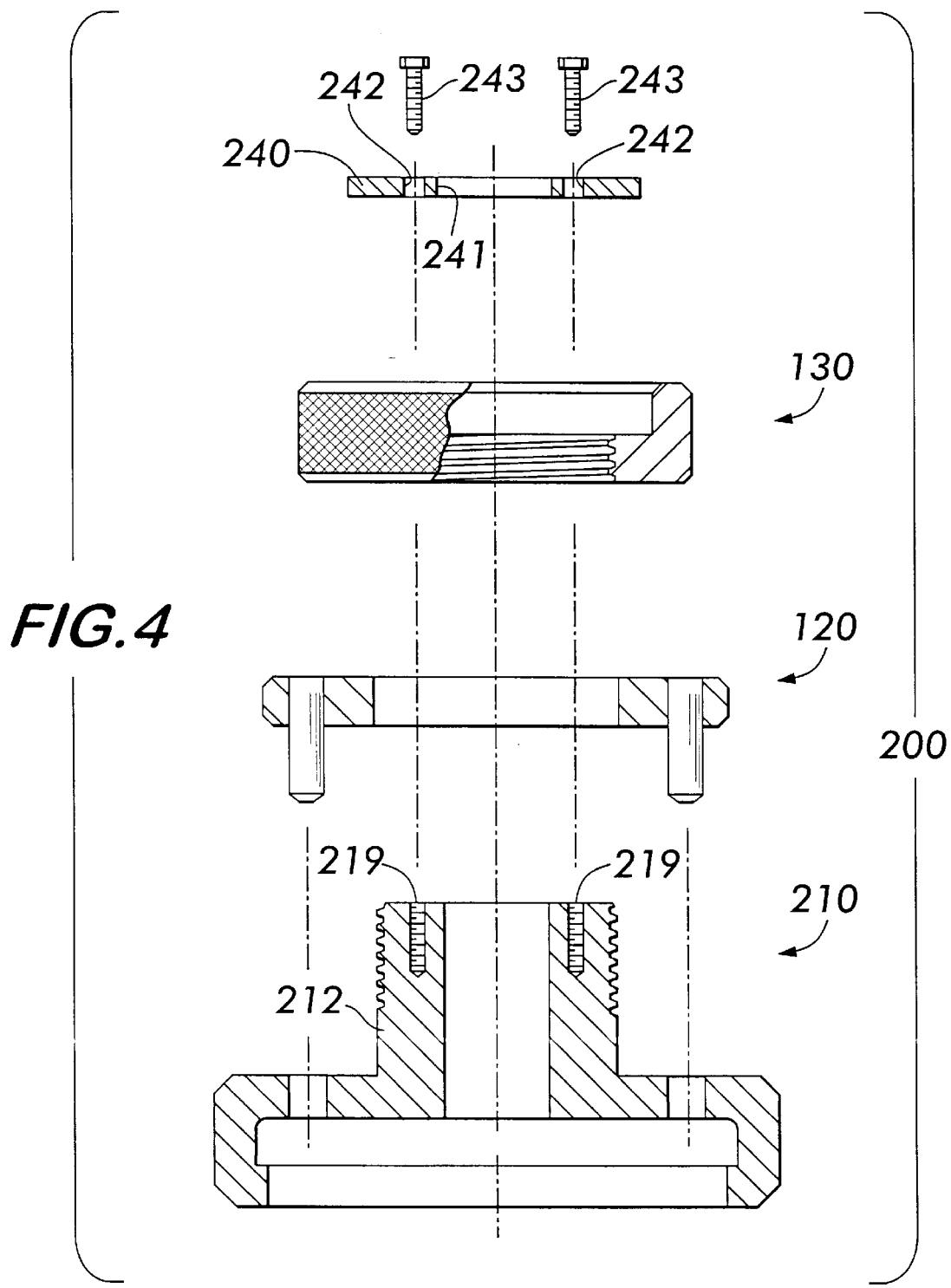
FIG. 4 is an exploded cross-sectional view of another embodiment of the coupling assembly.
Figure 5:
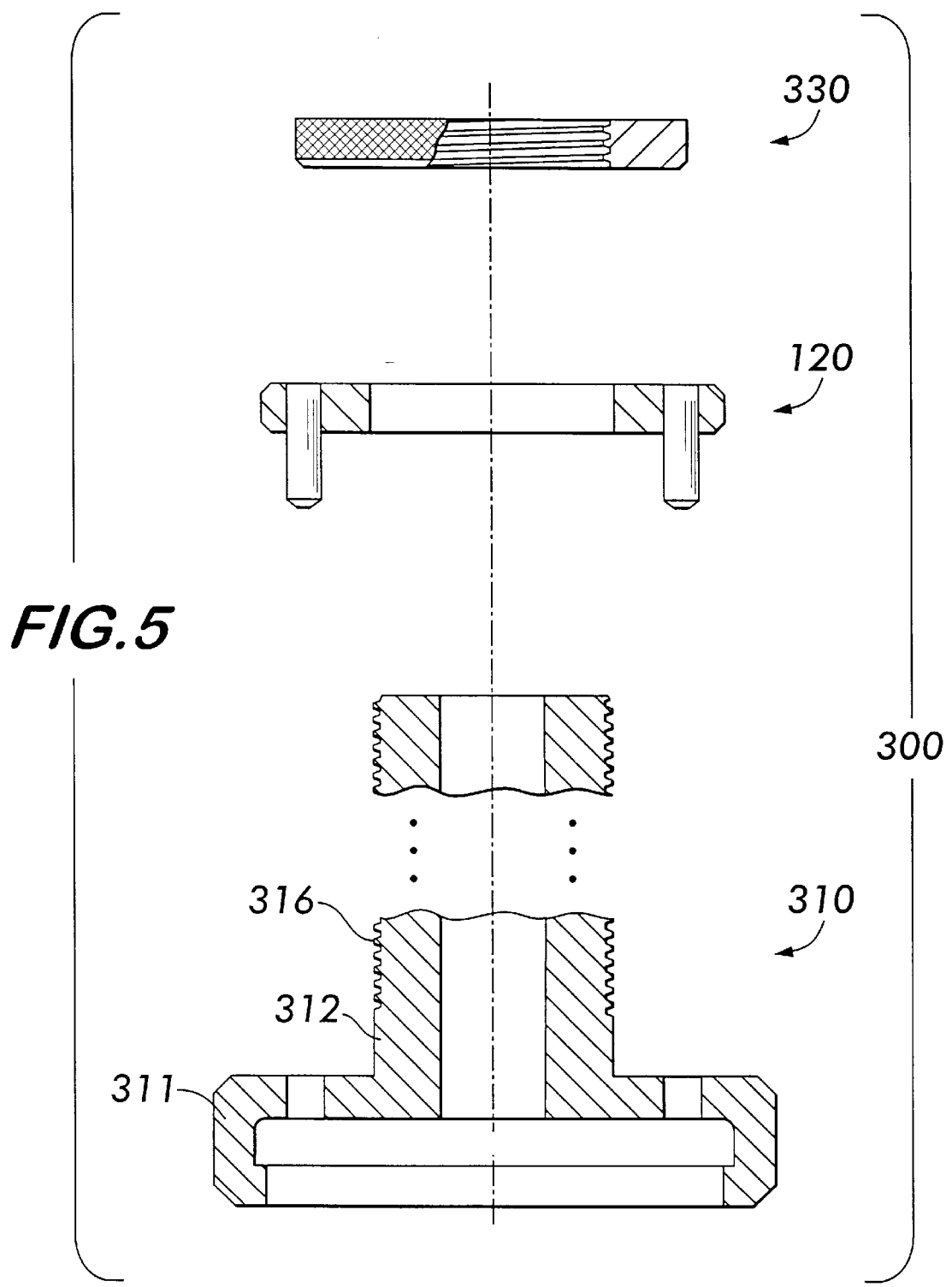
FIG. 5 is an exploded cross-sectional view of still another embodiment of the coupling assembly.

An added advantage of the embodiments illustrated in FIGS. 2 and 4 is that the coupling assemblies are small and lightweight but will not fall apart when being removed from a base plug. However, if size/weight or the possibility of disassembly is of no concern, the present invention can be implemented as illustrated in FIG. 5. Coupling assembly 300 includes a base 310 that is nearly identical to base 110, the same pin assembly 120 described above, and a basic finger nut 330. While retaining the same inventive features of the earlier embodiments, the threaded portion of second portion 312 is lengthened so that when finger nut 330 is spun away from first portion 311, there are a substantial amount of threads 316 to retain finger nut 330 easily thereon. It is therefore to be understood that, within the scope of the appended claims, the invention may be practiced other than as specifically described.

What is claimed as new and desired to be secured by letters patent of the united states is:

1. An assembly for coupling a drive portion of a torque wrench to a bolt having a head formed with spanner wrench holes in a top thereof and formed with an annular groove therearound, said assembly comprising:

a base having a first portion for engaging said annular groove until said first portion is in coaxial alignment with said bolt, said first portion being provided with aligning holes therethrough alignable with at least two of said spanner wrench holes;

said base further having a cylindrical second portion with its exterior radial surface at least partially threaded, said second portion coaxially aligned with said bolt and said first portion, said second portion having a first end centrally positioned between said aligning holes and fixedly coupled to said first portion, said second portion having a second end shaped to receive said drive portion of said torque wrench;

a plurality of pins, each of said plurality of pins sized for sliding engagement with said aligning holes in said first portion and said spanner wrench holes in said head;

a yoke for fixing said plurality of pins in relation to one another and in alignment with said aligning holes, said yoke straddling said second portion of said base wherein, when said yoke abuts said first portion, said plurality of pins engage said at least two of said aligning holes; and a collar nut having an inside surface that is at least partially threaded for engagement with said radial surface of said second portion wherein said collar nut can be spun on said second portion to retain said yoke against said first portion.

2. An assembly as in claim 1 wherein said first portion is integral with said second portion.

3. An assembly as in claim 1 wherein said first portion of said base is configured to slide into engagement with said annular groove.

4. An assembly as in claim 1 wherein said yoke can slide axially along said second portion.

5. An assembly as in claim 4 wherein said yoke encircles said second portion.

6. An assembly as in claim 1 further comprising a limit stop coupled to said second portion of said base for engaging said collar nut as said collar nut is spun away from said first portion wherein said collar nut is prevented from being separated from said assembly.

7. An assembly as in claim 1 wherein an exterior surface of said collar nut is knurled.

8. An assembly for coupling a drive portion of a torque wrench to a bolt having a head formed with spanner wrench holes in a top thereof and formed with an annular groove therearound, said assembly comprising:

a base having a first portion for sliding engagement with said annular groove until said first portion is in coaxial alignment with said bolt, said first portion being provided with aligning holes therethrough alignable with at least two of said spanner wrench holes;

said base further having a cylindrical second portion with its exterior radial surface at least partially threaded, said second portion coaxially aligned with said bolt and said first portion, said second portion having a first end centrally positioned between said aligning holes and fixedly coupled to said first portion, said second portion having a second end shaped to receive said drive portion of said torque wrench;

a plurality of pins, each of said plurality of pins sized for sliding engagement with said aligning holes in said first portion and said spanner wrench holes in said head;

a yoke for fixing said plurality of pins in relation to one another and in alignment with said aligning holes, said yoke encircling said second portion of said base and slidable axially therealong wherein, when said yoke abuts said first portion, said plurality of pins are engaged in said at least two of said aligning holes;

a collar nut having an inside surface that is at least partially threaded for engagement with said radial surface of said second portion wherein said collar nut can be spun on said second portion to move said yoke towards said first portion; and a limit stop coupled to said second portion of said base for engaging said collar nut as said collar nut is spun away from said first portion wherein said collar nut is prevented from being separated from said assembly.

9. An assembly as in claim 8 wherein said first portion is integral with said second portion.

10. An assembly as in claim 8 wherein said limit stop comprises an annular retainer attached to said second portion, said annular retainer having an outside diameter greater than that of said second portion of said base wherein said collar nut eventually abuts said annular retainer as said collar nut is spun away from said first portion.

11. An assembly as in claim 8 wherein an exterior surface of said collar nut is knurled.

12. An assembly for coupling a drive portion of a torque wrench to a bolt having a head formed with spanner wrench holes in a top thereof and formed with an annular groove therearound, said assembly comprising:

a base having a first portion for sliding engagement with said annular groove until said first portion is in coaxial alignment with said bolt, said first portion being provided with aligning holes therethrough alignable with at least two of said spanner wrench holes;

said base further having a cylindrical second portion with its exterior radial surface at least partially threaded, said second portion coaxially aligned with said bolt and said first portion, said second portion having a first end centrally positioned between said aligning holes and fixedly coupled to said first portion, said second portion having a second end shaped to receive said drive portion of said torque wrench;

a plurality of pins, each of said plurality of pins sized for sliding engagement with said aligning holes in said first portion and said spanner wrench holes in said head;

a yoke for fixing said plurality of pins in relation to one another and in alignment with said aligning holes, said yoke encircling said second portion of said base and slidable axially therealong wherein, when said yoke abuts said first portion, said plurality of pins are engaged in said at least two of said aligning holes;

a collar nut having adjoining first and second collar portions sharing a common longitudinal axis, said first collar portion being threaded on its inside surface for engagement with said radial surface of said second portion wherein said collar nut can be spun on said second portion to move said yoke towards said first portion, said second collar portion having an inside diameter larger than that of said radial surface of said second portion wherein an annular lip is formed on the inside of said collar nut where said second collar portion adjoins said first collar portion; and an annular retainer sized to fit within said second collar portion, said annular retainer attached to said second portion wherein said annular lip eventually abuts said annular retainer as said collar nut is spun away from said first portion to prevent said collar nut and said yoke from being separated from said assembly.

13. An assembly as in claim 12 wherein said first portion is integral with said second portion.

14. An assembly as in claim 12 wherein an exterior surface of said collar nut is knurled.

\* \* \* \* \*